US008743059B2

(12) United States Patent
Rubanovich et al.

(10) Patent No.: US 8,743,059 B2
(45) Date of Patent: *Jun. 3, 2014

(54) WORD COMPLETION IN A HANDHELD ELECTRONIC DEVICE

(71) Applicant: Research In Motion Limited, Waterloo (CA)

(72) Inventors: Dan Rubanovich, Toronto (CA); Vadim Fux, Waterloo (CA); Michael Elizarov, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/861,938

(22) Filed: Apr. 12, 2013

(65) Prior Publication Data

US 2013/0222259 A1    Aug. 29, 2013

Related U.S. Application Data

(63) Continuation of application No. 13/541,584, filed on Jul. 3, 2012, now Pat. No. 8,441,448, which is a continuation of application No. 11/398,906, filed on Apr. 6, 2006, now Pat. No. 8,237,659.

(51) Int. Cl.
| | |
|---|---|
| *G06F 17/27* | (2006.01) |
| *H03K 17/94* | (2006.01) |
| *H03M 11/00* | (2006.01) |
| *G06F 3/02* | (2006.01) |
| *G09G 5/00* | (2006.01) |
| *G06F 3/048* | (2013.01) |

(52) U.S. Cl.
USPC ............... 345/168; 341/22; 341/23; 715/810; 715/811; 704/9

(58) Field of Classification Search
USPC .......................... 345/168; 341/22–23; 704/9; 715/810–811
See application file for complete search history.

(56) References Cited

U.S. PATENT DOCUMENTS 5,952,942 A * 9/1999 Balakrishnan et al. ......... 341/20
7,525,452 B2   4/2009 Fux et al.

(Continued)

FOREIGN PATENT DOCUMENTS

| EP | 1603014 A1 | 7/2005 |
| WO | 0062150 A1 | 10/2000 |

(Continued)

OTHER PUBLICATIONS

John J. Darragh, et al., "The Reactive Keyboard: A Predictive Typing Aid", Computer, IEEE Service Center, Nov. 1990, pp. 41-49, vol. 23, No. 11, Los Alamitos, CA, US.

(Continued)

*Primary Examiner* — Eric Yen
(74) *Attorney, Agent, or Firm* — Finnegan, Henderson, Farabow, Garrett & Dunner LLP

(57) ABSTRACT

A method for enabling generation of text on a handheld electronic device which has a plurality of input members, at least some of which have a number of linguistic elements assigned thereto, and a memory having language objects stored therein. The method comprises enabling detection of a number of input member actuations corresponding with an ambiguous input, making at least one of a determination that the number of actuations exceeds a first threshold and a determination that a quantity of predicted language objects corresponding with the ambiguous input is less than a second threshold, generating prefix objects corresponding with the ambiguous input and predicted language objects corresponding with the ambiguous input, each predicted language object comprising a prefix object portion and a completion portion, and providing at a text input location an output comprising a prefix object and a completion portion of a first predicted language object.

16 Claims, 5 Drawing Sheets

(56) References Cited

U.S. PATENT DOCUMENTS

| | | |
|---|---|---|
| 2002/0126097 A1* | 9/2002 | Savolainen ............... 345/168 |
| 2002/0152203 A1 | 10/2002 | Ostergaard et al. |
| 2004/0021691 A1 | 2/2004 | Dostie et al. |
| 2006/0265208 A1 | 11/2006 | Assadollahi |
| 2008/0244387 A1 | 10/2008 | Fux et al. |
| 2008/0244389 A1 | 10/2008 | Fux et al. |
| 2008/0255846 A1 | 10/2008 | Fux |

FOREIGN PATENT DOCUMENTS

| | | |
|---|---|---|
| WO | 0291160 A1 | 11/2002 |
| WO | 03060451 A1 | 7/2003 |

OTHER PUBLICATIONS

Examiner's Report in corresponding Canadian Patent Application No. 2,584,097, issued by Canadian Intellectual Property Office, dated Jun. 2, 2011 (4 pages).

Examiner's Report in corresponding Canadian Patent Application No. 2,584,097, issued by Canadian Intellectual Property Office, dated Jul. 14, 2010 (3 pages).

Examiner's Report in corresponding Canadian Patent Application No. 2,584,097, issued by Canadian Intellectual Property Office, dated May 28, 2009 (3 pages).

Decision to Refuse a European Patent Application in corresponding European Patent Application No. 06251961.6, issued by European Patent Office, dated Feb. 16, 2012 (24 pages).

Summons to Attend Oral Proceedings Pursuant to Rule 115(1) EPC in corresponding European Patent Application No. 06251961.6, issued by European Patent Office, dated Nov. 11, 2011 (6 pages).

Communication Pursuant to Article 94(3) EPC in corresponding European Patent Application No. 06251961.6, issued by European Patent Office, dated Mar. 14, 2008 (8 pages).

Communication Pursuant to Article 96(2) EPC in corresponding European Patent Application No. 06251961.6, issued by European Patent Office, dated Jul. 24, 2006 (9 pages).

European Search Report in corresponding European Patent Application No. 06251961.6, issued by European Patent Office, dated Jun. 20, 2006 (4 pages).

\* cited by examiner

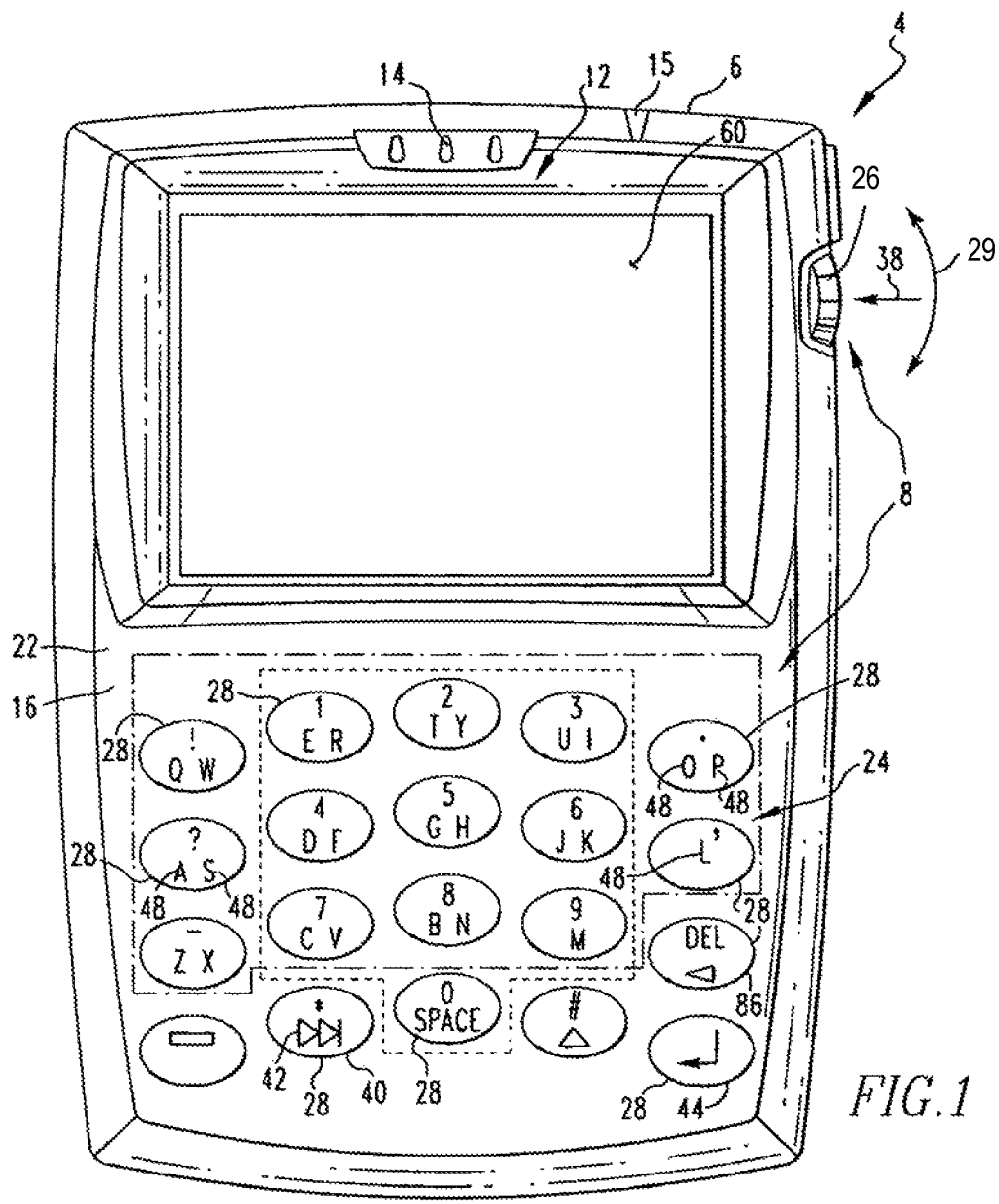
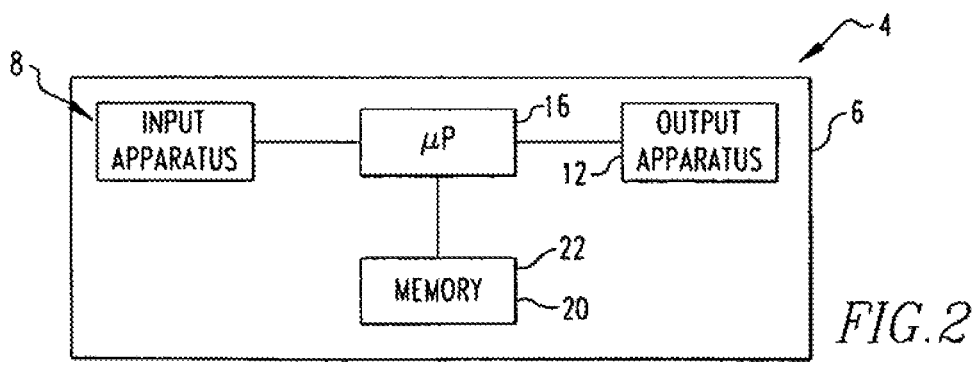

WORD COMPLETION IN A HANDHELD ELECTRONIC DEVICE

This is a continuation of application Ser. No. 13/541,584, filed Jul. 3, 2012, which is a continuation of application Ser. No. 11/398,906, filed Apr. 6, 2006, which issued as U.S. Pat. No. 8,237,659, contents of both of which are incorporated herein by reference.

BACKGROUND

1. Field

The disclosure relates generally to handheld electronic devices and, more particularly, to an improved method of inputting text on a handheld electronic device.

2. Background Information

Numerous types of handheld electronic devices are known. Examples of such handheld electronic devices include, for instance, personal data assistants (PDAs), handheld computers, two-way pagers, cellular telephones, and the like. Although some handheld electronic devices are stand-alone devices, many feature wireless communication capability for communication with other devices.

Such handheld electronic devices are generally intended to be portable, and thus are of a relatively compact configuration in which keys and other input structures often perform multiple functions under certain circumstances or may otherwise have multiple aspects or features assigned thereto. With advances in technology, handheld electronic devices are built to have progressively smaller form factors yet have progressively greater numbers of applications and features resident thereon. As a practical matter, the keys of a keypad can only be reduced to a certain small size before the keys become relatively unusable. In order to enable text entry, however, a keypad must be capable of entering all twenty-six letters of the Latin alphabet, for instance, as well as appropriate punctuation and other symbols.

One way of providing numerous letters in a small space has been to provide a "reduced keyboard" in which multiple letters, symbols, and/or digits, and the like, are assigned to any given key. For example, a touch-tone telephone includes a reduced keypad by providing twelve keys, of which ten have digits thereon, and of these ten keys eight have Latin letters assigned thereto. For instance, one of the keys includes the digit "2" as well as the letters "A", "B", and "C". Other known reduced keyboards have included other arrangements of keys, letters, symbols, digits, and the like. Since a single actuation of such a key potentially could be intended by the user to refer to any of the letters "A", "B", and "C", and potentially could also be intended to refer to the digit "2", the input generally is an ambiguous input and is in need of some type of disambiguation in order to be useful for text entry purposes.

In order to enable a user to make use of the multiple letters, digits, and the like on any given key, numerous keystroke interpretation systems have been provided. For instance, a "multi-tap" system allows a user to substantially unambiguously specify a particular character on a key by pressing the same key a number of times equivalent to the position of the desired character on the key. For example, on the aforementioned telephone key that includes the letters "ABC", and the user desires to specify the letter "C", the user will press the key three times. While such multi-tap systems have been generally effective for their intended purposes, they nevertheless can require a relatively large number of key inputs compared with the number of characters that ultimately are output.

Another exemplary keystroke interpretation system would include key chording, of which various types exist. For instance, a particular character can be entered by pressing two keys in succession or by pressing and holding a first key while pressing a second key. Still another exemplary keystroke interpretation system would be a "press-and-hold/press-and-release" interpretation function in which a given key provides a first result if the key is pressed and immediately released, and provides a second result if the key is pressed and held for a short period of time. While the systems have likewise been generally effective for their intended purposes, such systems also have their own unique drawbacks.

Another keystroke interpretation system that has been employed is a software-based text disambiguation function. In such a system, a user typically presses keys to which one or more characters have been assigned, generally pressing each key one time for each desired letter, and the disambiguation software attempts to determine the intended input. More specifically, the disambiguation software produces a list of suggested prefix objects that the user may select while typing a message. Typically, after selecting one of the suggested prefix objects, the user must press additional keys to enter the remaining characters needed to complete the desired word.

It would be desirable to provide an improved handheld electronic device with a reduced keyboard that seeks to mimic a QWERTY keyboard experience or other particular keyboard experience. Such an improved handheld electronic device might also desirably be configured with enough features to enable text entry and other tasks with relative ease. More specifically, it would be desirable for such an improved handheld electronic device to have improved text entry capabilities.

BRIEF DESCRIPTION OF THE DRAWINGS

A full understanding can be gained from the following Description of the Preferred Embodiment when read in conjunction with the accompanying drawings in which:

FIG. 1 is a top plan view of an improved handheld electronic device.

FIG. 2 is a schematic depiction of the handheld electronic device of FIG. 1.

DESCRIPTION OF THE PREFERRED EMBODIMENT

Figure 3:
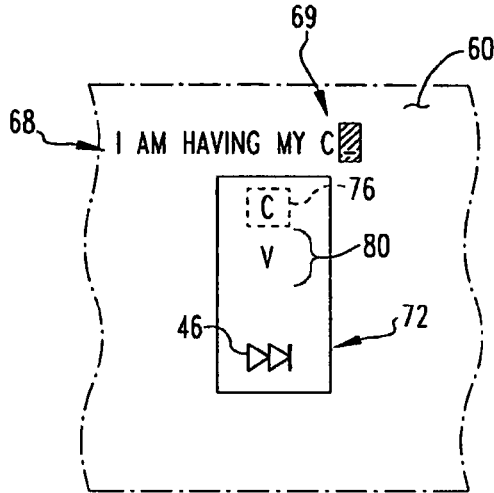
FIG. 3 is an exemplary output during a text entry operation.

An improved handheld electronic device 4 is indicated generally in FIG. 1 and is depicted schematically in FIG. 2. The exemplary handheld electronic device 4 includes a housing 6 upon which is disposed a processor unit that includes an input apparatus 8, an output apparatus 12, a processor 16, and a memory 20 for storing at least a first routine 22. The processor 16 may be, for instance, and without limitation, a microprocessor (μP) and is responsive to input signals from the input apparatus 8 and provides output signals to the output apparatus 12. The processor 16 also interfaces with the memory 20 and is capable of executing the at least first routine 22. Examples of handheld electronic devices are included in U.S. Pat. No. 6,452,588, U.S. Pat. No. 6,873,317, and U.S. Pat. No. 6,489,950, which are incorporated by reference herein.

As can be understood from FIG. 1, the output apparatus 12 includes a display 60, an LED 15, and a speaker 14, each of which may be responsive to one or more output signals from the processor 16. The input apparatus 8 includes a keypad 24 and a thumbwheel 26. The keypad 24 is in the exemplary form of a full QWERTY keyboard including a plurality of keys 28 that serve as input members. The keys 28 are disposed on a front face of the housing 6, and the thumbwheel 26 is disposed at a side of the housing 6. The thumbwheel 26 can serve as another input member and is both rotatable, as is indicated by the arrow 29, to provide input to the processor 16, and also can travel in a direction generally toward the housing 6, as is indicated by the arrow 38, to provide other input to the processor 16.

Many of the keys 28 include a number of linguistic elements 48 disposed thereon. As employed herein, the expression "a number of" and variations thereof shall refer broadly to any non-zero quantity, including a quantity of one. As can be seen in FIG. 1, one of the keys 28 of the keypad 24 includes as the linguistic elements 48 thereof the letter "O" and the letter "P". Generally speaking, the handheld electronic device 4 is structured such that the processor 16 recognizes, as an input thereof, one of the number of linguistic elements 48 disposed on an actuated key 28. For example, when a user is composing a message and actuates the key 28 having the linguistic elements 48 "O" and "P" disposed thereon, the processor 16 is structured to recognize that the user is attempting to insert the letter "O" or the letter "P" into the message.

The memory 20 can be any one or more of a variety of types of internal and/or external storage media such as, without limitation, RAM, ROM, EPROM(s), EEPROM(s), and the like that provide a storage register for data storage such as in the fashion of an internal storage area of a computer, and can be volatile memory or nonvolatile memory. The memory 20 includes a number of routines depicted generally with the numeral 22 for the processing of data. The routines 22 can be in any of a variety of forms such as, without limitation, software, firmware, and the like. As will be explained in greater detail below, the routines 22 include a disambiguation application and a predictive text application, as well as other routines.

An exemplary input sequence is depicted in FIGS. 3-8. In this example, the user is in the process of entering the message "I am having my carpet cleaned tomorrow" (See FIG. 8). Referring briefly to FIG. 3, the words "I am having my" have been output as a text component 68 on display 60. Each word (e.g., "I", "am", "having", and "my") represents a delimited input as is generally known. As seen in FIG. 3, the user has also actuated the key 28 having the linguistic elements <C> and <V> disposed thereon. As a result, the disambiguation application 22 generates a first prefix object "C" as well as another prefix object "V". Each prefix object is associated with a frequency object. In the current embodiment, the frequency object associated with the prefix object "C" has a frequency value greater than that of the frequency object associated with prefix object "V". Thus, the prefix object "C" is provided at a text input location 69.

Additionally, the disambiguation application generates a variant component 72 comprised of a default portion 76, a variant portion 80, and a functional portion 46. In the current embodiment, the prefix object located at the default portion 76 is the same as the prefix object displayed at the text input location 69 (i.e., the prefix object "C"). In the current embodiment, the functional portion 46 allows, for example, the user to scroll to view additional prefix objects should the number of prefix objects returned by the disambiguation application exceed the display space available in the variant component 72.

In the current embodiment, the number of actuations detected by the processor 16 (e.g., after a delimited input) is compared to a first threshold value. If the number of actuations detected is less than the first threshold, the predictive text application is not executed by the processor 16. However, if the number of actuations detected is greater than or equal to the first threshold, the predictive text application may be executed by the processor 16.

In the current embodiment, for example, the first threshold is set at two. As seen in FIG. 3, because only one input member actuation has thus far been detected (i.e., the actuation of the key 28 having linguistic elements <C> and <V> disposed thereon) after the last delimited input (e.g., the keystroke sequence <m><y><space>), the predictive text application is not executed by the processor 16.

Figure 4:
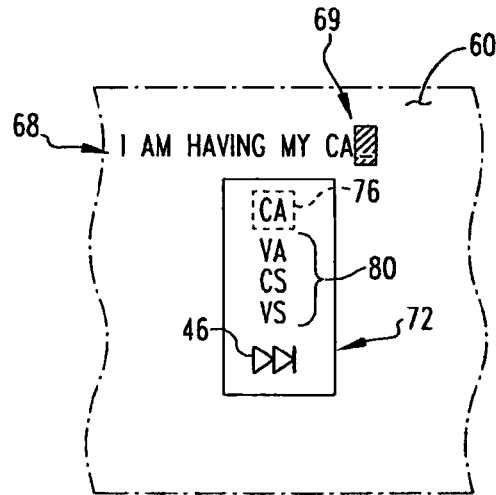
FIG. 4 is another exemplary output during another part of the text entry operation.

Referring now to FIG. 4, the user has actuated the key 28 having the linguistic elements <A> and <S> disposed thereon. As a result, the disambiguation application 22 generates the prefix object "CA" at the default portion 76 and the prefix objects "VA", "CS", and "VS" at the variant portion 80. The prefix object "CA" is also provided as an output at the text input location 69. Because the number of input member actuations thus far detected is greater than or equal to the first threshold (i.e., two), a determination is made as to whether the number of predicted words corresponding to the detected input member actuations is less than a second threshold. The second threshold prevents the predictive text application from running should a large number of predicted language objects correspond to the detected input. In the current example, the second threshold is selected such that the predictive text application is not executed by the processor 16 for the detected input because the detected input corresponds to a large number of predicted words (i.e., a large number of predicted words begin with the letters "ca", "va", "cs", and "vs").

Figure 5:
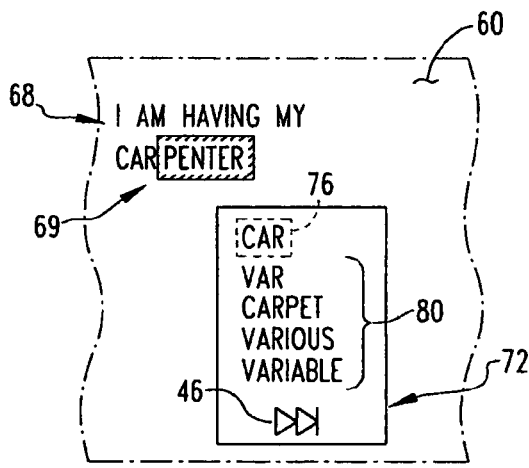
FIG. 5 is another exemplary output during another part of the text entry operation.

Referring now to FIG. 5, the user has actuated the key 28 having the linguistic elements <E> and <R> disposed thereon. As a result, the disambiguation application 22 generates the prefix object "CAR" at the default portion 76 and the prefix object "VAR" at the variant portion 80. The prefix object "CAR" is also provided as an output at the text input location 69. Because the number of input member actuations detected is greater than the first threshold and the number of predicted Words is less than the second threshold, the predictive text application is executed by the processor 16. The predictive text application generates a number of predicted language objects each having a frequency object associated therewith. As shown in FIG. 5, for example, the predictive text application generates the predicted language objects "carpenter", "carpet", "various", and "variable". Each predicted language object is comprised of a prefix object portion and a completion portion. For instance, the predicted language object "carpenter" is comprised of the prefix object portion "car" and the completion portion "penter"; the predicted language object "carpet" is comprised of the prefix object portion "car" and the completion portion "pet"; the predicted language object "various" is comprised of the prefix object portion "var" and the completion portion "ious"; and the predicted language object "variable" is comprised of the prefix object portion "var" and the completion portion "iable".

In the current embodiment, the completion portion of a first predictive language object is provided at the text input location 69. As shown in FIG. 5, the completion portion "penter" from the predicted language object "carpenter" is provided at the text input location 69 in a different font type (e.g., backlit). The user is able, among others, to select the prefix object "car", select the predicted word "carpenter", select one of the prefix objects or predicted words listed in the variant portion 80, or continue text entry. More specifically, the user can highlight a desired object/word by, among others, positioning a cursor at the desired object/word and select the desired object/word by, among others, actuating the thumbwheel, pressing the space key, pressing the return key, and/or dwelling at the word for a certain amount of time.

Figure 6:
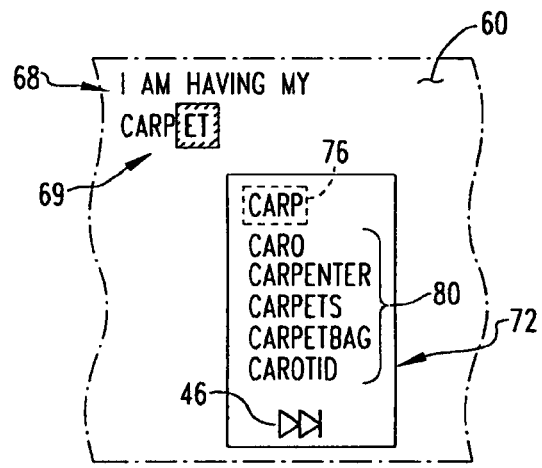
FIG. 6 is another exemplary output during another part of the text entry operation.

Referring now to FIG. 6, the user has actuated the key 28 having the linguistic elements <O> and <P> disposed thereon. As a result, the disambiguation application 22 generates the prefix object "CARP" at the default portion 76 and the prefix object "CARO" at the variant portion 80. The prefix object "CARP" is also provided as an output at the text input location 69. Because the number of input member actuations detected is greater than the first threshold and the number of predicted words is less than the second threshold, the predictive text application generates a number of additional predicted language objects. As shown in FIG. 6, for example, the predictive text application generates the additional predicted language objects "carpet", "carpenter", "carpets", "carpetbag", and "carotid". Each additional predicted language object is also comprised of a prefix object portion and a completion portion.

In the current embodiment, the completion portion of a first predictive language object is provided at the text input location 69 in a different font type (e.g., backlit). As shown in FIG. 6, the completion portion "pet" from the predicted language object "carpet" is provided at the text input location 69. The user is able, among others, to select the prefix object "carp", select the predicted word "carpet", select one of the prefix objects or predicted words listed in the variant portion 80, or continue text entry.

It should be noted that even though the predicted language object "carpenter" has an associated frequency object that is greater than the frequency object associated with the predicted language object "carpet", the completion portion "pet" for the predicted language object "carpet" is provided as an output at the text input location 69 in FIG. 6. This is because an assumption is made that the user, who could have selected the predicted language object "carpenter" when the completion portion "penter" was provided as an output at the text input location 69 (i.e., FIG. 6), does not wish to enter the word "carpenter" in the text input location 69.

Figure 7:
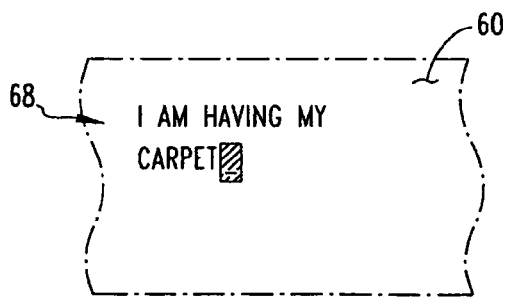
FIG. 7 is another exemplary output during another part of the text entry operation.
Figure 8:
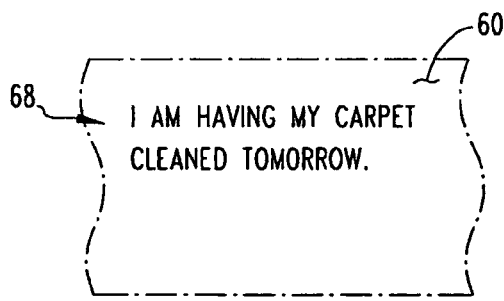
FIG. 8 is another exemplary output during another part of the text entry operation.

As discussed above, the user desires to enter the word "carpet" in his message. Accordingly, the user highlights and/or selects the completion portion "et" of the predicted language object "carpet" in the text input location 69. The word may be highlighted by, among others, positioning a cursor at the desired word and selected by, among others, actuating the thumbwheel, pressing the space key, pressing the return key, and/or dwelling at the word for a certain amount of time. Referring to FIG. 7, the word "carpet" (a delimited input) is displayed at the text component 68 and the text input location is blank (e.g., only a cursor is present). FIG. 8 illustrates the full message input by the user in the current example.

Figure 9:
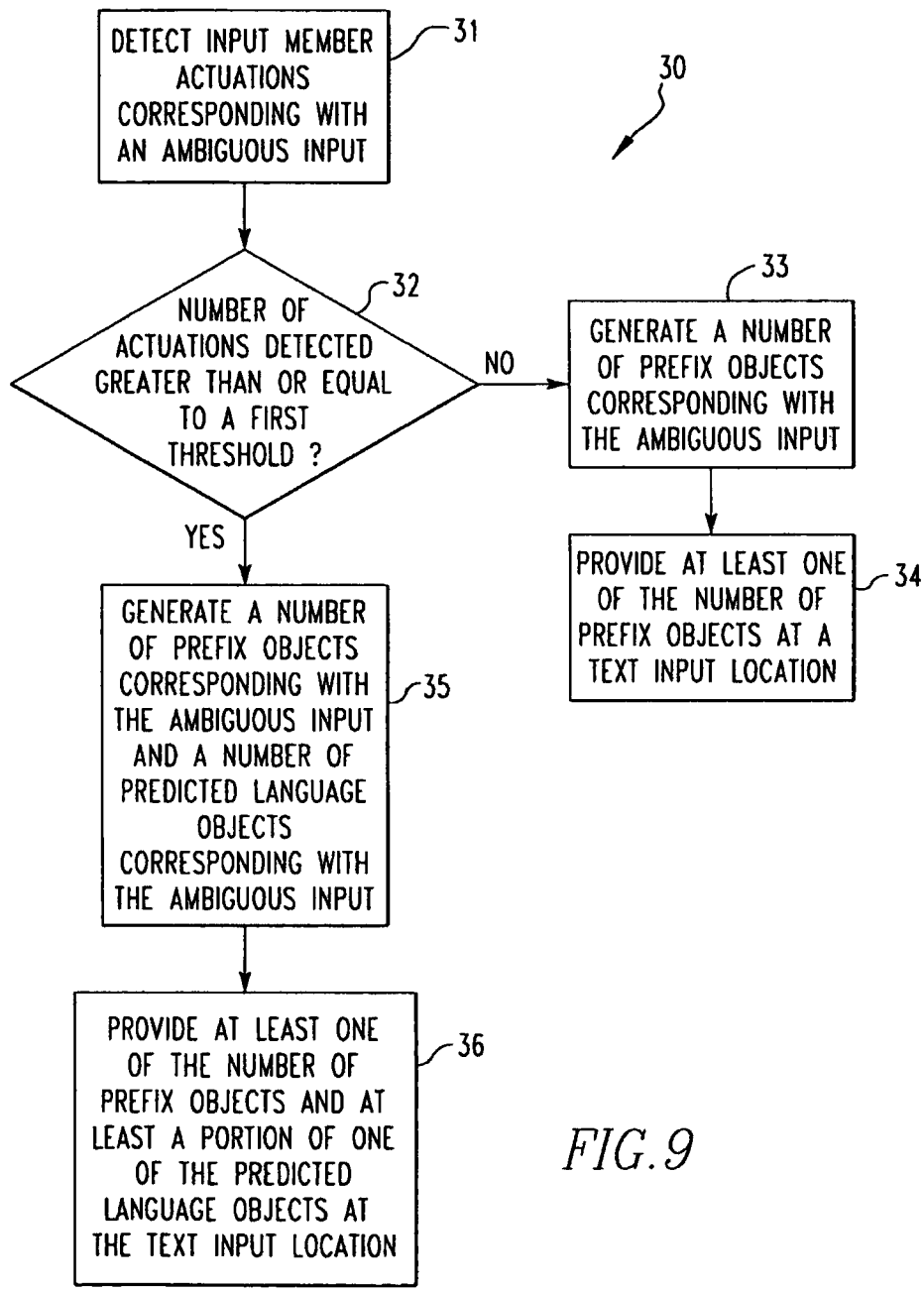
FIG. 9 is an exemplary flowchart depicting certain aspects of the disambiguation and predictive text functions that can be executed on the handheld electronic device of FIG. 1 according to one embodiment.

FIG. 9 illustrates an operational process 30 for generating text on the handheld electronic device 4 shown in FIG. 1 according to one embodiment. Operational process 30 is initiated at operation 31 when, for example, processor 16 detects the actuation of a number of input members, such as and without limitation, keys 28 and/or thumbwheel 26.

A determination is then made at operation 32 as to whether the number of actuations detected is greater than a first threshold. If the number of actuations detected is less than a first threshold, operational control branches "NO" and operation 33 generates a number of prefix objects corresponding with the ambiguous input. After the prefix objects are generated, at least one prefix object is output, for example, to a text input location 69 of the display 60 in operation 34.

If the number of actuations detected is greater than a first threshold, then operational control branches "YES" and operation 35 generates a number of prefix objects corresponding with the ambiguous input and a number of predicted language objects corresponding to the ambiguous input. Each predicted language object is comprised of a prefix object portion and a completion portion. After the prefix objects and predicted language objects are generated, at least one prefix object and a portion of one of the predicted language objects is output in operation 36. In the current embodiment, for example, at least one prefix object and the completion portion of one predicted language object is output to the text input location 69 of the display 60. It should be noted that, in the current embodiment, the processor 16 only provides at the text input location the completion portion of a predicted language object which has a prefix object portion that is the same as the prefix object being output at the text input location.

Figure 10:
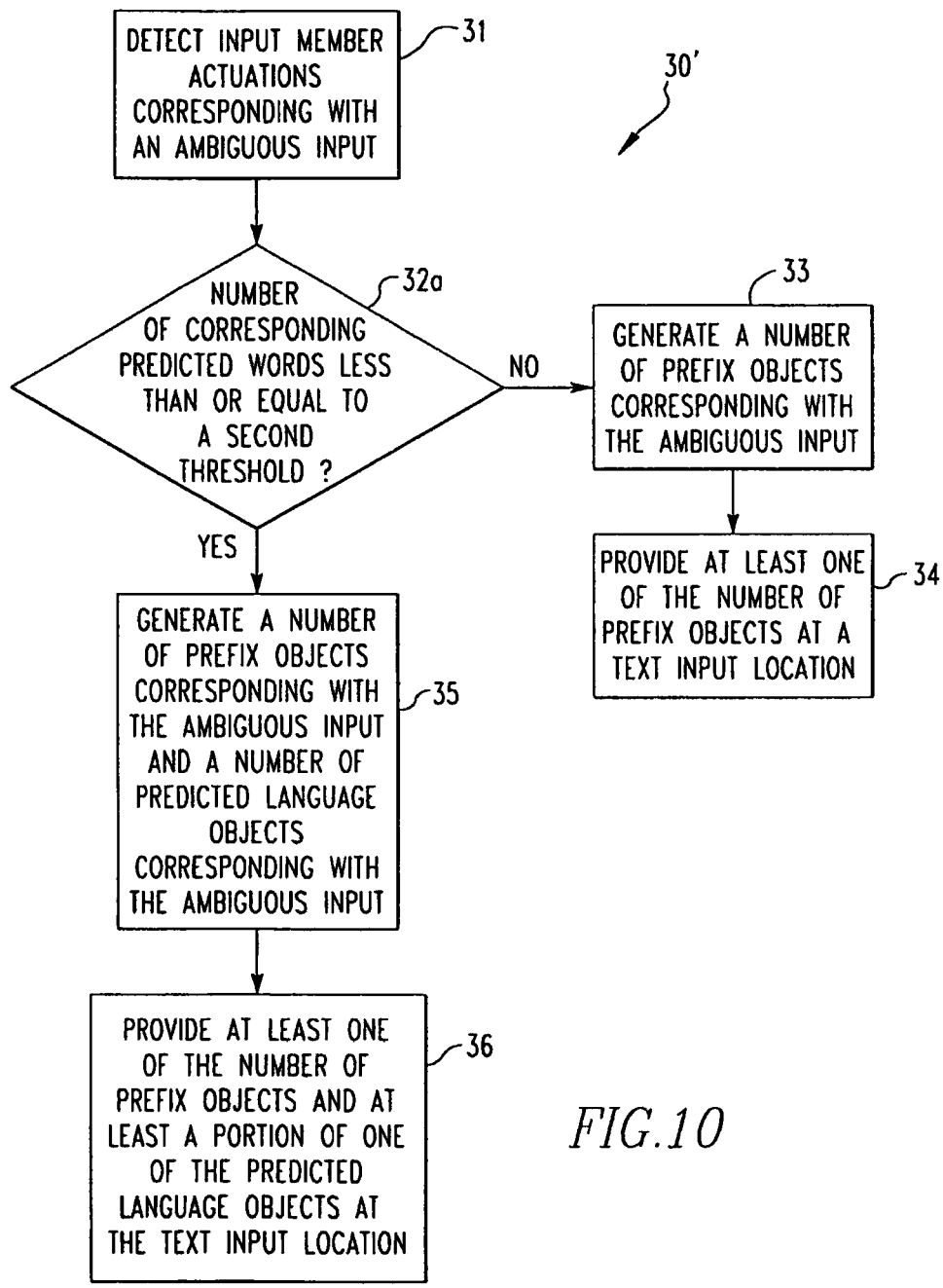
FIG. 10 is an exemplary flowchart depicting certain aspects of the disambiguation and predictive text functions that can be executed on the handheld electronic device of FIG. 1 according to another embodiment.

FIG. 10 illustrates an operational process 30' for generating text on the handheld electronic device 4 shown in FIG. 1 according to another embodiment. Operational process 30' is initiated at operation 31 when, for example, processor 16 detects the actuation of a number of input members, such as and without limitation, keys 28 and/or thumbwheel 26.

A determination is then made at operation 32a as to whether the number of corresponding predicted words is less than a second threshold. If the number of corresponding predicted words is not less than the second threshold, operational control branches "NO" and operation 33 generates a number of prefix objects corresponding with the ambiguous input. After the prefix objects are generated, at least one prefix object is output, for example, to a text input location 69 of the display 60 in operation 34.

If the number of corresponding predicted words is less than the second threshold, then operational control branches "YES" and operation 35 generates a number of prefix objects corresponding with the ambiguous input and a number of predicted language objects corresponding to the ambiguous input. Each predicted language object is comprised of a prefix object portion and a completion portion. After the prefix objects and predicted language objects are generated, at least one prefix object and a portion of one of the predicted language objects is output in operation 36. In the current embodiment, for example, at least one prefix object and the completion portion of one predicted language object is output to the text input location 69 of the display 60. It should be noted that, in the current embodiment, the processor 16 only provides at the text input location 69 the completion portion of a predicted language object which has a prefix object portion that is the same as the prefix object being output at the text input location.

Figure 11:
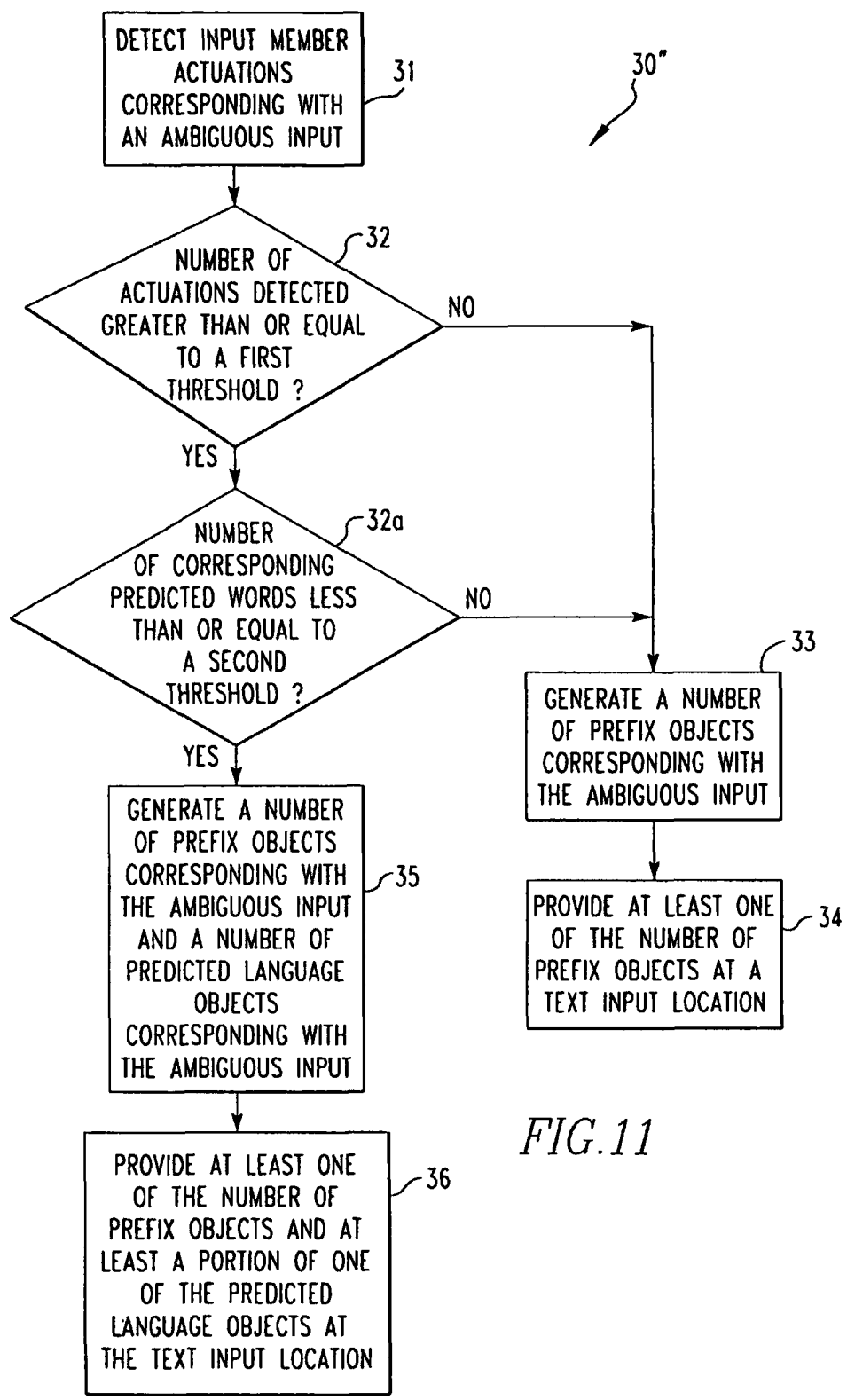
FIG. 11 is an exemplary flowchart depicting certain aspects of the disambiguation and predictive text functions that can be executed on the handheld electronic device of FIG. 1 according to another embodiment.

FIG. 11 illustrates an operational process 30" for generating text on the handheld electronic device 4 shown in FIG. 1 according to another embodiment. Operational process 30" is initiated at operation 31 when, for example, processor 16 detects the actuation of a number of input members, such as and without limitation, keys 28 and/or thumbwheel 26.

A determination is then made at operation 32 as to whether the number of actuations detected is greater than a first threshold. If the number of actuations detected is less than a first threshold, operational control branches "NO" and operation 33 generates a number of prefix objects corresponding with the ambiguous input. After the prefix objects are generated, at least one prefix object is output, for example, to a text input location 69 of the display 60 in operation 34.

If the number of actuations detected is greater than a first threshold, then operational control branches "YES" and a determination is made at operation 32a as to whether the number of corresponding predicted words is less than a second threshold. If the number of corresponding predicted words is not less than the second threshold, operational control branches "NO" and operation 33 generates a number of prefix objects corresponding with the ambiguous input. As discussed above, after the prefix objects are generated, at least one prefix object is output, for example, to a text input location 69 of the display 60 in operation 34.

If the number of corresponding predicted words is less than the second threshold, then operational control branches "YES" and operation 35 generates a number of prefix objects corresponding with the ambiguous input and a number of predicted language objects corresponding to the ambiguous input. Each predicted language object is comprised of a prefix object portion and a completion portion. After the prefix objects and predicted language objects are generated, at least one prefix object and a portion of one of the predicted language objects is output in operation 36. In the current embodiment, for example, at least one prefix object and the completion portion of one predicted language object is output to the text input location 69 of the display 60. It should be noted that, in the current embodiment, the processor 16 only provides at the text input location 69 the completion portion of a predicted language object which has a prefix object portion that is the same as the prefix object being output at the text input location.

While specific embodiments have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. A method for enabling generation of text on a handheld electronic device comprising a processor, a plurality of keys and a memory, a least some of the keys each having a number of linguistic elements assigned thereto, and the memory having a plurality of language objects stored therein, the method comprising:
enabling, by the processor, detection of a number of key selections corresponding with an ambiguous input;
setting, by the processor, a threshold, the threshold having a value of at east two;
only after the processor determines that the number of key selections is greater than or equal to the threshold,
generating, by the processor, a first set of predicted language objects corresponding to the ambiguous input; and
providing, by the processor, at a text input location an output comprising a first predicted language object selected from the first set of predicted language objects.

2. The method of claim 1, further comprising:
generating prefix objects according to the key selections, each prefix object being associated with a frequency value,
wherein each of the first set of predicted language objects comprises a first portion and a second portion, and
wherein a first portion of the first predicted language object is the same as a prefix object having a largest frequency value.

3. The method of claim 2, further comprising:
providing at a variant component location an output comprising at least some of the prefix objects;
enabling selection of one of the at least some of the prefix objects; and
responsive to the selection, replacing the first predicted language object provided at the text input location with the one of the at least some of the prefix objects.

4. The method of claim 1, further comprising:
providing at a variant component location an output comprising a subset of the first set of predicted language objects.

5. The method of claim 4, further comprising:
enabling selection of a second predicted language object from the subset of the first set of predicted language objects, the second predicted language object being different from the first predicted language object; and
responsive to the selection, replacing the first predicted language object provided at the text input location with the second predicted language object.

6. The method of claim 1, further comprising:
detecting an additional key selection as a further ambiguous input;
generating a second set of predicted language objects corresponding to the ambiguous input and the further ambiguous input; and
replacing the first predicted language object provided at the text input location with a second predicted language object selected from the second set of predicted language objects.

7. The method of claim 6, wherein a number of predicted language objects in the first set is larger than a number of predicted language objects in the second set.

8. A method for enabling generation of text on a handheld electronic device comprising a processor, a plurality of keys and a memory, a least some of the keys each having a number of linguistic elements assigned thereto, and the memory having a plurality of language objects stored therein, the method comprising:
enabling, by the processor, detection of a number of key selections corresponding with an ambiguous input;
setting, by the processor, a threshold;

only after the processor determines that a quantity of predicted language objects corresponding to the ambiguous input is less than the threshold,
generating, by the processor, a first set of predicted language objects corresponding to the ambiguous input; and
providing, by the processor, at a text input location an output comprising a first predicted language object selected from the first set of predicted language objects.

9. A handheld electronic device comprising:
an input apparatus comprising a plurality of keys, at least some of the keys each having a number of linguistic elements assigned thereto;
an output apparatus;
a memory having a plurality of language objects stored therein; and
a processor, configured to:
  detect a number of key selections corresponding with an ambiguous input;
  set a threshold, the threshold having a value of at least two;
  only after determining that the number of key selections is greater than or equal to the threshold,
    generate a first set of predicted language objects corresponding to the ambiguous input; and
    provide, at a text input location on the output apparatus, an output comprising a first predicted language object selected from the first set of predicted language objects.

10. The device of claim 9,
wherein the processor is further configured to generate prefix objects according to the key selections, each prefix object being associated with a frequency value,
wherein each of the first set of predicted language objects comprises a first portion and a second portion, and
wherein a first portion of the first predicted language object is the same as a prefix object having a largest frequency value.

11. The device of claim 10, wherein the processor is further configured to:
provide, at a variant component location on the output apparatus, an output comprising at least some of the prefix objects;
enable selection of one of the at least some of the prefix objects; and
responsive to the selection, replace the first predicted language object provided at the text input location with the one of the at least some of the prefix objects.

12. The device of claim 9, wherein the processor is further configured to provide, at a variant component location on the output apparatus, an output comprising a subset of the first set of predicted language objects.

13. The device of claim 12, wherein the processor is further configured to:
enable selection of a second predicted language object from the subset of the first set of predicted language objects, the second predicted language object being different from the first predicted language object; and
responsive to the selection, replace the first predicted language object provided at the text input location with the second predicted language object.

14. The device of claim 9, wherein the processor is further configured to:
detect an additional key selection as a further ambiguous input;
generate a second set of predicted language objects corresponding to the ambiguous input and the further ambiguous input; and
replace the first predicted language object provided at the text input location with a second predicted language object selected from the second set of predicted language objects.

15. The device of claim 14, wherein a number of predicted language objects in the first set is larger than a number of predicted language objects in the second set.

16. A handheld electronic device comprising:
an input apparatus comprising a plurality of keys, at least some of the keys each having a number of linguistic elements assigned thereto;
an output apparatus;
a memory having a plurality of language objects stored therein; and
a processor, configured to:
  detect a number of key selections corresponding with an ambiguous input;
  set a threshold;
  only after determining that a quantity of predicted language objects corresponding to the ambiguous input is less than the threshold,
    generate a first set of predicted language objects corresponding to the ambiguous input; and
    provide, at a text input location on the output apparatus, an output comprising a first predicted language object selected from the first set of predicted language objects.

* * * * *